W. BERNEY.
Hand-Saw.
No. 207,159.  Patented Aug. 20, 1878.
Fig. 1.
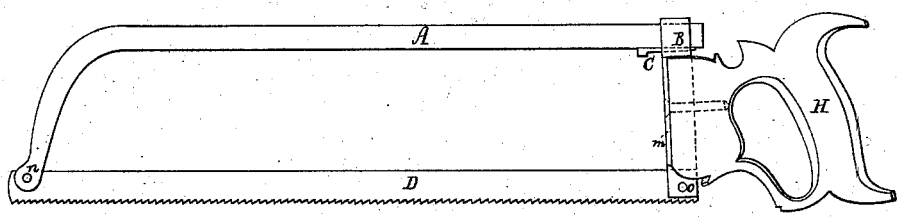
Fig. 2.
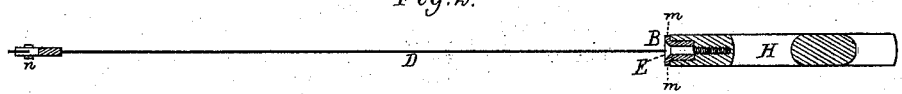
Fig. 3.  Fig. 4.  Fig. 5.
 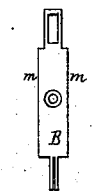 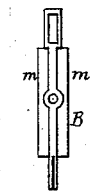
Fig. 6.
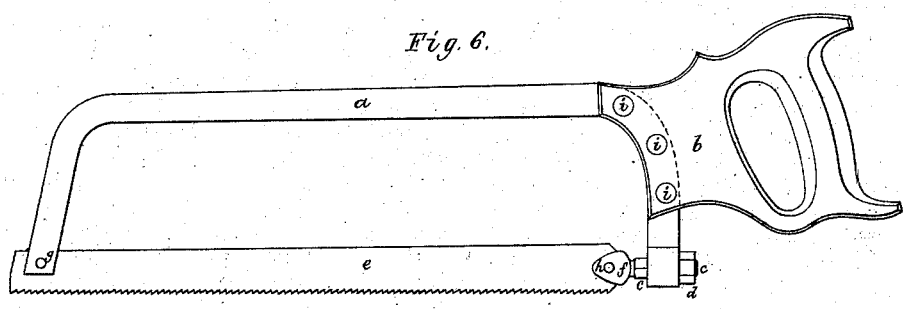
Witnesses  
S. N. Piper  
John R. Snow
Inventor.  
William Berney.  
by his attorney  
R. H. Eddy

UNITED STATES PATENT OFFICE.

WILLIAM BERNEY, OF SOMERVILLE, MASSACHUSETTS.

IMPROVEMENT IN HANDSAWS.

Specification forming part of Letters Patent No. 207,159, dated August 20, 1878; application filed August 5, 1878.

*To all whom it may concern:*

Be it known that I, WILLIAM BERNEY, of Somerville, of the county of Middlesex and State of Massachusetts, have invented a new and useful Improvement in Butchers' Saws or the Frames thereof; and do hereby declare the same to be described in the following specification and represented in the accompanying drawings, of which—

Figure 1 is a side view, and Fig. 2 a longitudinal and transverse section, of a saw with my improvement. Fig. 3 is a side elevation, Fig. 4 a front view, and Fig. 5 a rear view, of the connection-piece hereinafter referred to and described. Fig. 6 is a side view of the saw on which my improvement is based.

In the saw shown in the figure last named, the back $a$ is in one piece, and extends into and through the handle $b$, and receives at its lower end a blade-straining screw, $c$, provided with a nut, $d$. The saw-blade $e$ is inserted into kerfs in the front end of the back $a$, and in the head $f$ of the straining-screw, and is held to such back and head by rivets $g$ $h$ going through it and them. The back is secured to the handle by screws going transversely through both, (their heads being shown at $i$ $i$ $i$,) and nuts being screwed on such screws.

With a saw so constructed the blade in breaking, while in use, most always is ruptured close to its junction with the back or the head of the straining-screw, and when so broken a new blade becomes necessary in place of the broken one, because the saw-frame or back has no means of lengthwise reduction to adapt it to receive and properly hold the broken blade. My improved saw is provided with such means.

Furthermore, in using the old form of saw, the front end of the handle, being but partially protected, is very liable to become notched or injured when forced against a bone, or from other causes. In my improved saw the connection-piece is made so as to cover and protect from injury the said front end of the handle; and, furthermore, the said connection-piece is held to the handle by a single screw going through the piece and into the handle lengthwise of such handle. The connection-piece has flanges projecting from it in opposite directions. They not only answer to cover and protect the end of the handle from injury, as described, but as abutments for the handle to bear against while the saw is cutting or being impelled forward. Very little force is exerted in retracting the saw, in comparison to what is required in pushing it forward, while it may be in use.

It will be seen that with the flanges of the connection-piece, and with my arrangement of the screw which confines such connection-piece to the handle, the said screw receives little or no strain while the saw is being forced forward against a bone or object. Consequently the handle is not so liable to work loose relatively to the back as when it is held to the back by screws going transversely through them.

In carrying out my invention, I compose the saw-frame of a back or bar, A, shaped essentially as shown, and of a separate mortised connection-piece, B, they being applied together and to the handle H, and provided with a holding-wedge, C, and connected with the saw-blade D, substantially in manner as represented and hereinafter explained.

The connection-piece B is let into the handle H, and furnished with flanges $m$ $m$, to cover the exposed parts of the front edge of the handle, and for such parts to abut against, the connection-piece being confined to the handle by a screw, E, going through it (the said piece) at its middle, and screwed into the handle lengthwise thereof.

Furthermore, the said connection-piece projects both above and below the handle, such piece at its upper part having a mortise extending through it to receive the back A and the holding-wedge C, in manner as shown. At their lower ends or parts the back and connection-piece are notched or provided with kerfs to receive the saw-blade, which is fastened to them by rivets, as shown at $n$ $o$.

From the above it will readily be observed that in case of breakage, as described, of the saw-blade near either of its ends, a new rivet-hole may be made in it, and the back A may be set or slid rearward in the connection-piece far enough to allow of the blade being again fitted to place, which having been accomplished, the wedge should be driven into the mortise. In being so driven the wedge not only fastens the back to the connection-piece, but moves the back laterally, so as to strain the saw-blade to the requisite tightness, thereby saving all necessity of a straining-screw and nut, as employed in the old kind of saw, as shown in Fig. 6.

I would remark that there are various other saws besides those termed "butchers' saws" to which my improvement is applicable.

What I claim as my invention is as follows:

1. The saw-frame as composed of the back A and the separate mortised connection-piece B, applied to each other and to the handle H, and provided with the holding-wedge C, all being arranged with and to support the blade and to operate therewith, substantially as set forth.

2. The back, blade, and handle connection-piece B, as provided with the flanges $m\ m$, extended from it so as to lap on the exposed parts of the inner end of the handle H, such being as and for the purpose or purposes specified.

3. The connection-piece B, as provided with the flanges $m\ m$, and having its fastening-screw E extending through it into the handle lengthwise of the latter, as shown and described.

WM. BERNEY.

Witnesses:
R. H. EDDY,
JOHN R. SNOW.